(12) United States Patent
Simrin

(10) Patent No.: US 6,974,296 B2
(45) Date of Patent: Dec. 13, 2005

(54) CLEANOUT COVER SYSTEM FOR UNLOADING PARTICULATE MATERIAL FROM RECIPROCATING FLOOR ASSEMBLIES

(76) Inventor: Kirk A. Simrin, P.O. Box 71396, Eugene, OR (US) 97401

( * ) Notice: Subject to any disclaimer, the term of this patent is extended or adjusted under 35 U.S.C. 154(b) by 0 days.

(21) Appl. No.: 10/913,679

(22) Filed: Aug. 5, 2004

(65) Prior Publication Data

US 2005/0042067 A1 Feb. 24, 2005

Related U.S. Application Data

(60) Provisional application No. 60/493,420, filed on Aug. 7, 2003.

(51) Int. Cl.[7] ................................................ B60P 1/00
(52) U.S. Cl. ................................... 414/525.1; 414/527
(58) Field of Search ............................. 414/525.1, 527

(56) References Cited

U.S. PATENT DOCUMENTS

| | | | | |
|---|---|---|---|---|
| 4,277,220 A | * | 7/1981 | Wiley | 414/539 |
| 4,629,390 A | * | 12/1986 | Burke | 414/527 |
| 4,892,456 A | * | 1/1990 | Hodgetts | 414/527 |
| 4,948,325 A | * | 8/1990 | Hodgetts | 414/527 |
| 5,156,518 A | * | 10/1992 | VanMatre | 414/527 |
| 6,033,179 A | | 3/2000 | Abbott | |
| 6,350,099 B1 | * | 2/2002 | Hughes | 414/527 |

\* cited by examiner

*Primary Examiner*—Joe Dillon, Jr.
(74) *Attorney, Agent, or Firm*—Olson & Olson

(57) ABSTRACT

The cleanout cover system of this invention is operable with a container having a reciprocating slat-type conveyor for supporting and moving particulate material rearwardly at an unloading site. The container has laterally spaced side walls and a front connecting wall, the rear end being operable for unloading. The cleanout system includes a flexible cover sheet spanning the distance between the side walls and an elongated strap connected at one end to the center point of the front end of the cover and at its opposite end to a strap wind-up reel powered by a pneumatic motor. The reel and motor assembly is mounted on the container adjacent the upper end of the front wall of the container centrally between the side walls. A brake system associated with the reel serves to prevent unwinding of the strap when the pneumatic motor is deactivated after the strap is wound fully onto the reel with the cover suspending therefrom and permit unwinding of the strap when pulling tension is applied by the cover during unloading operation of the reciprocating slat-type conveyor of the container.

22 Claims, 13 Drawing Sheets

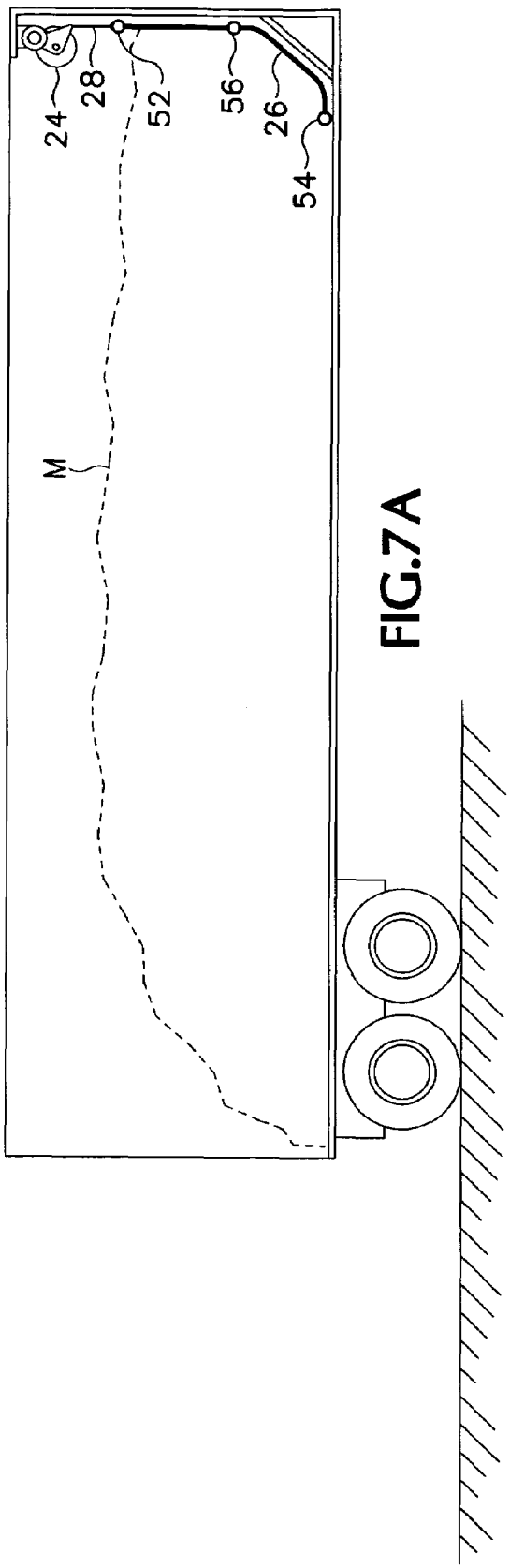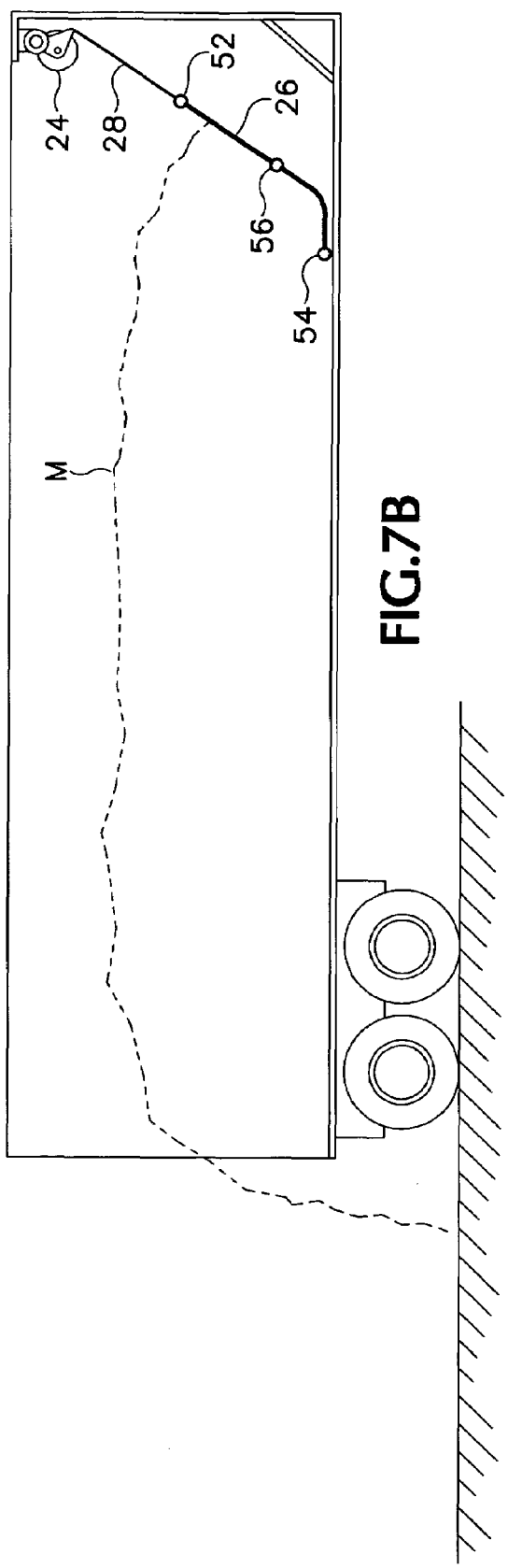

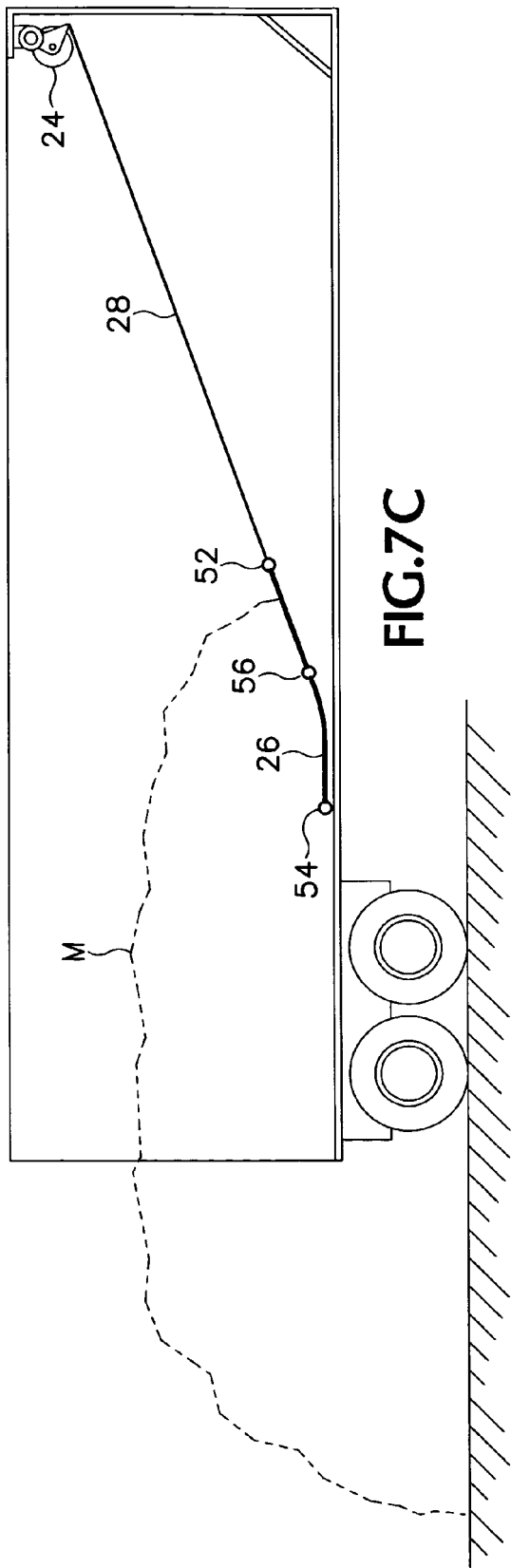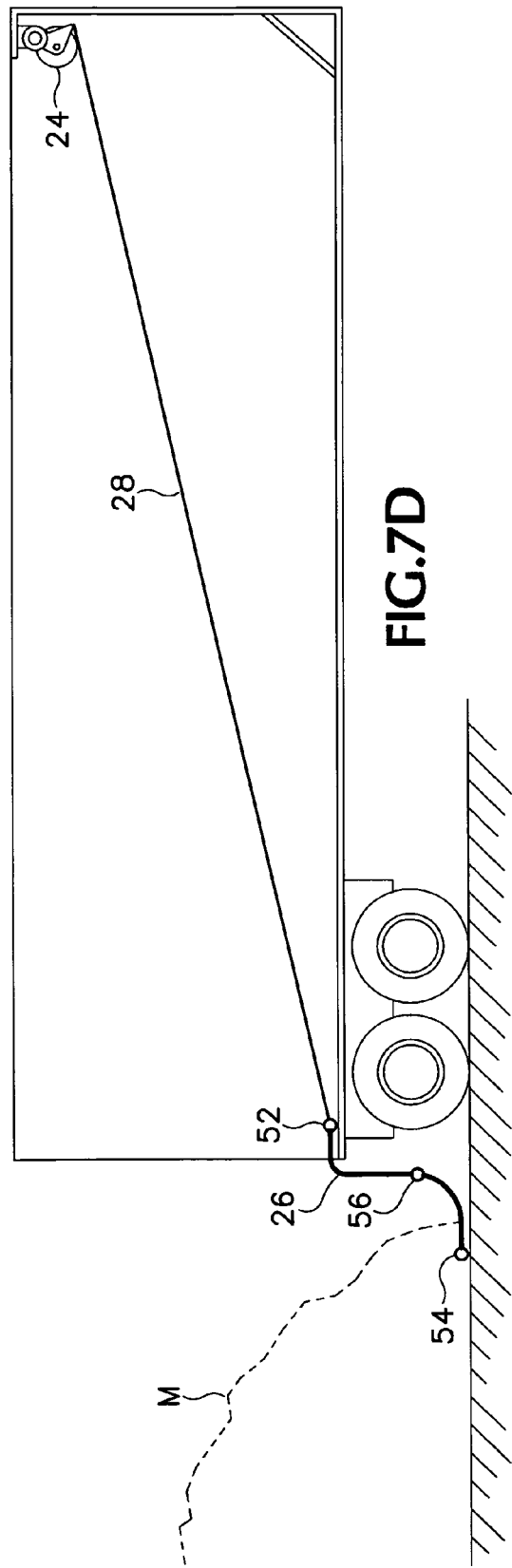

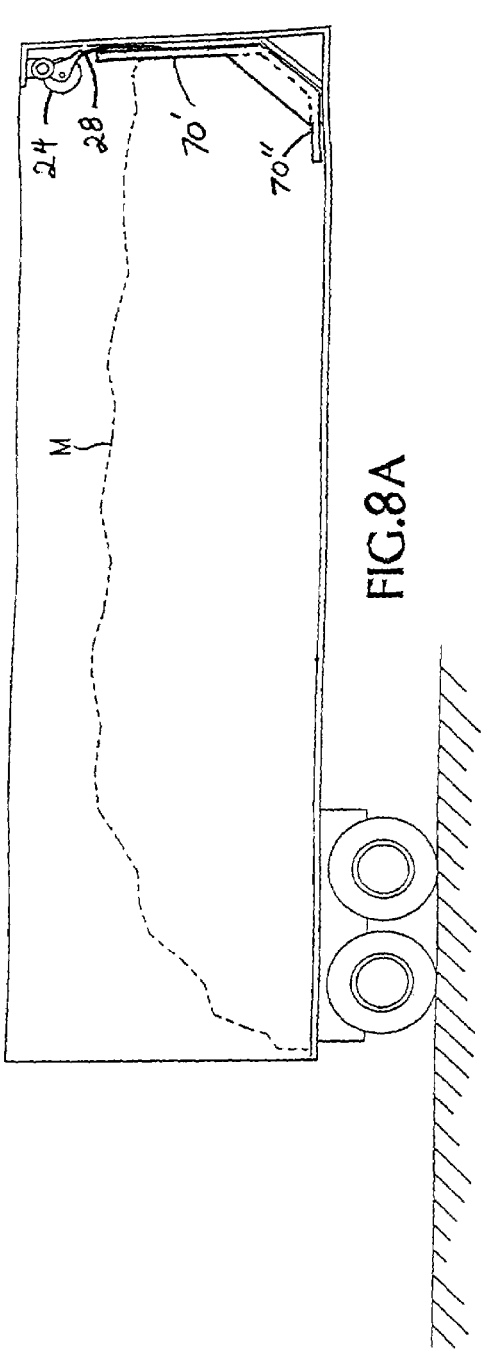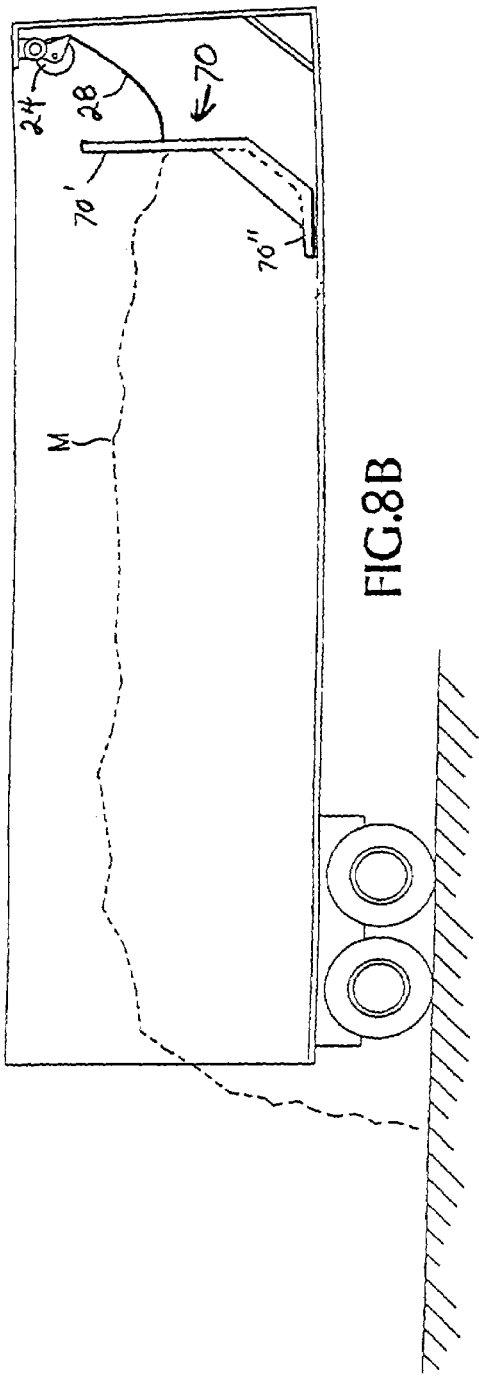

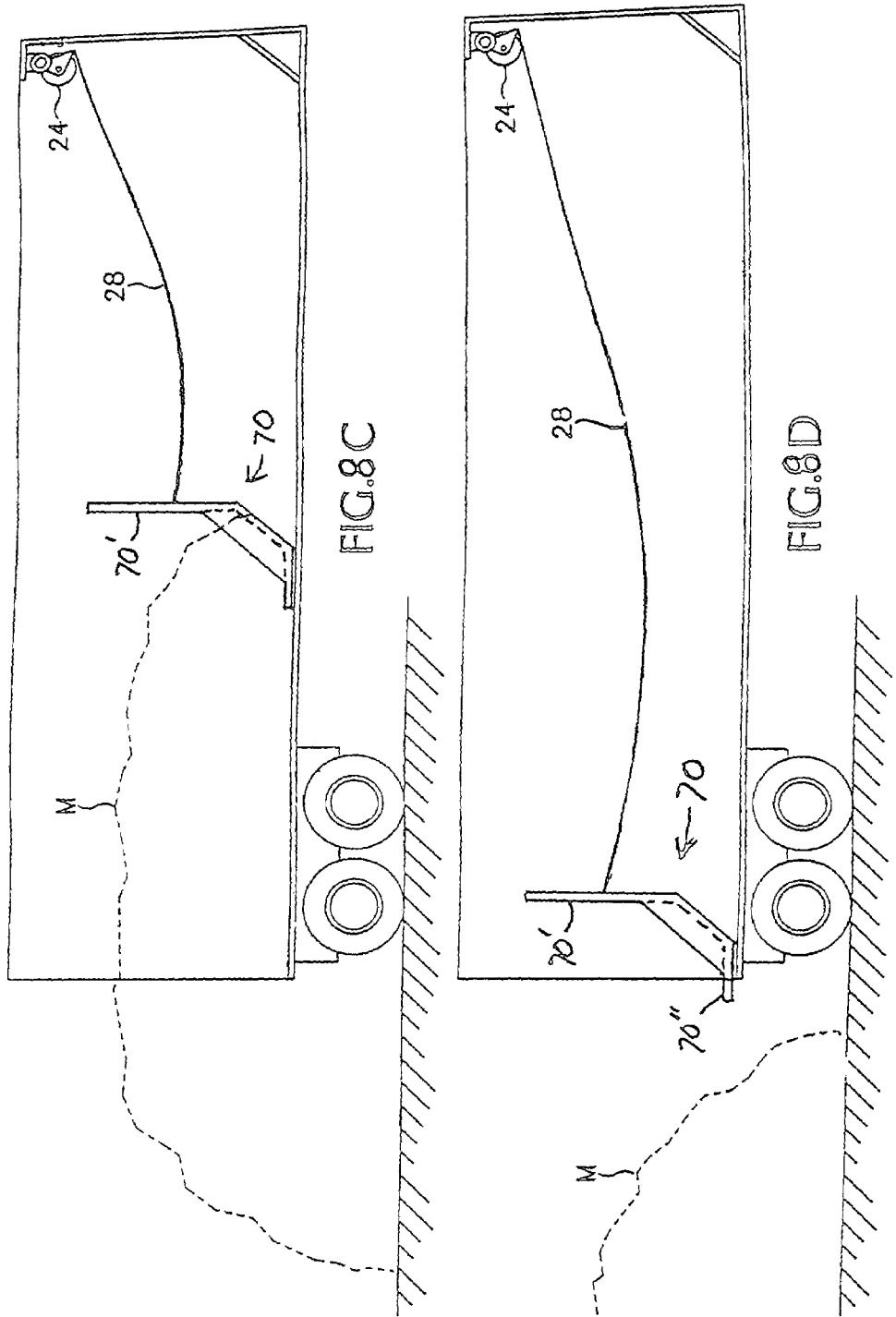

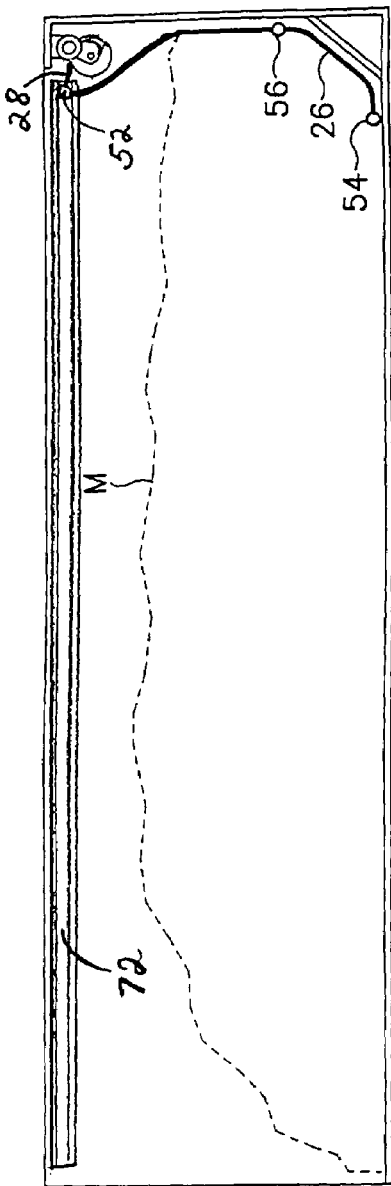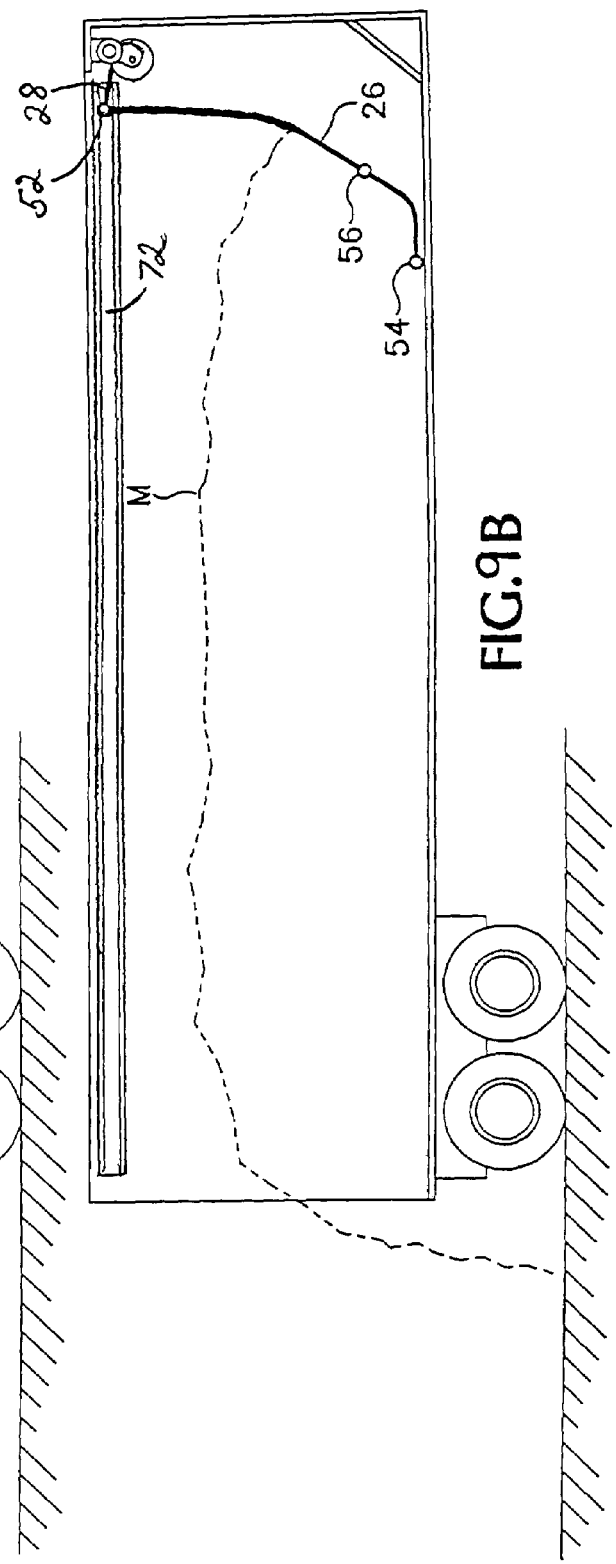
FIG.9A
FIG.9B

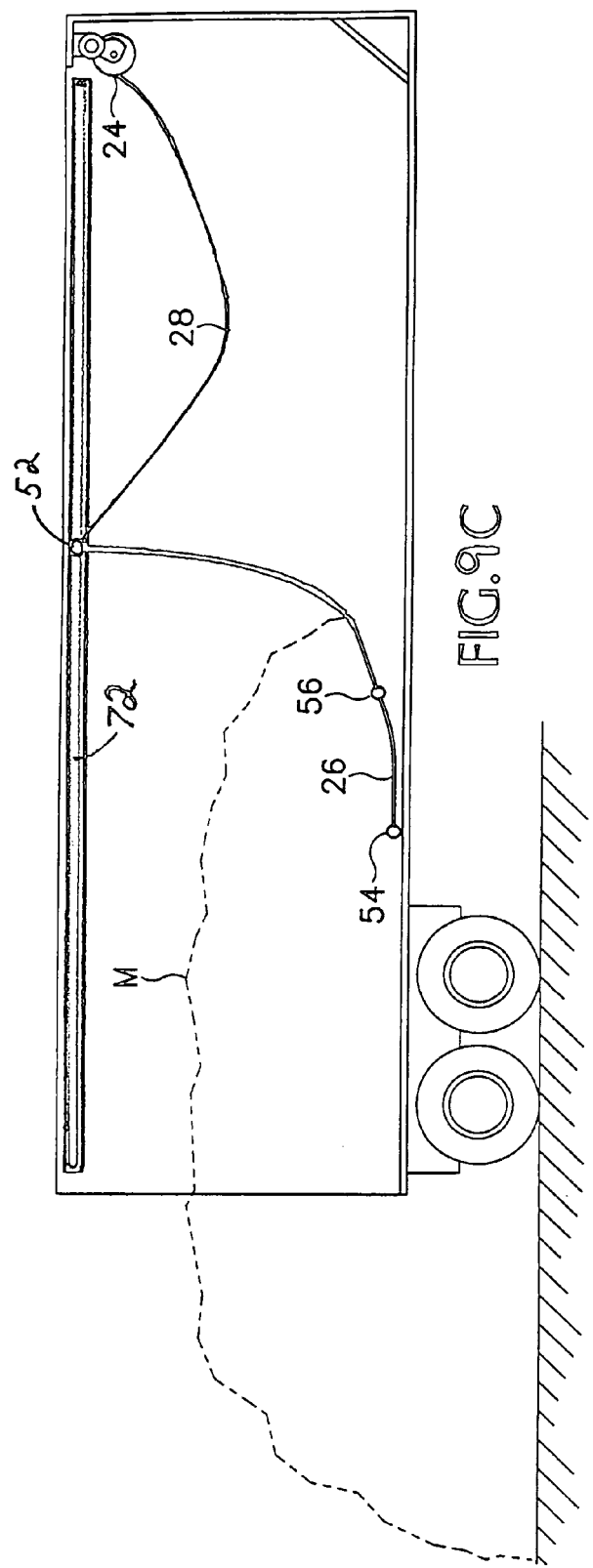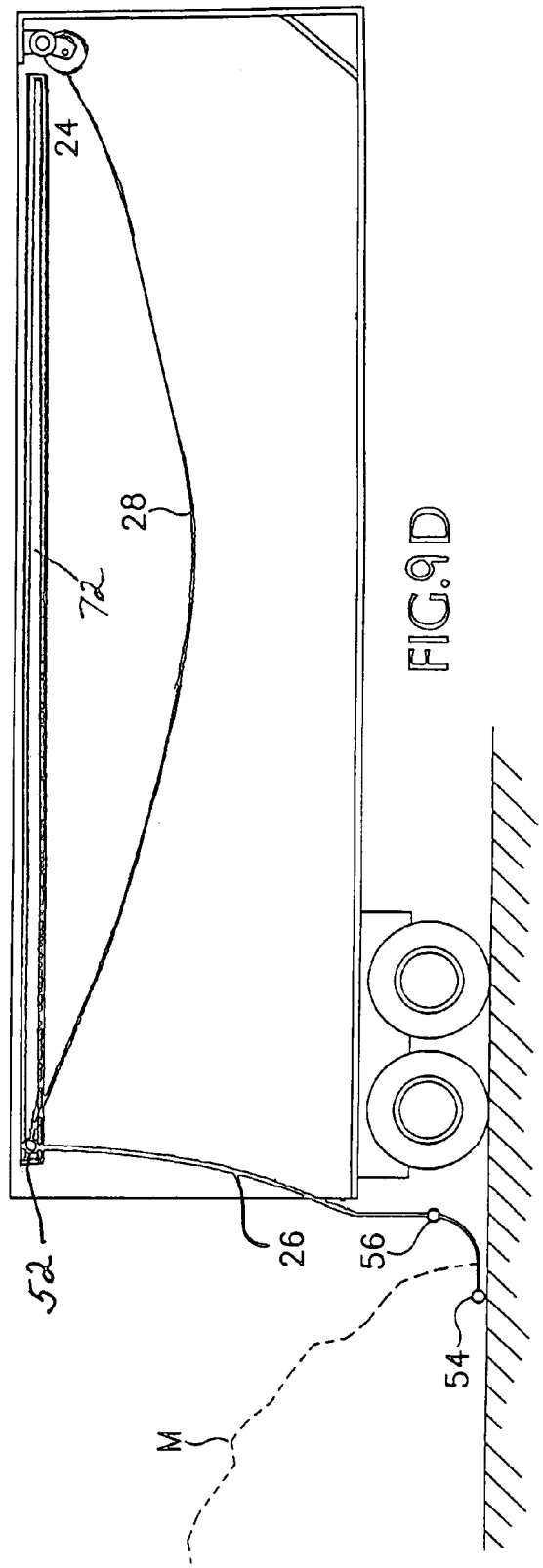

CLEANOUT COVER SYSTEM FOR UNLOADING PARTICULATE MATERIAL FROM RECIPROCATING FLOOR ASSEMBLIES

This application claims the benefit under 35 U.S.C 119(e) of U.S. Provisional application No. 60/493,420 filed 7 Aug. 2003.

BACKGROUND OF THE INVENTION

This invention relates to the unloading of particulate material from a reciprocating floor, and more particularly to the unloading of particulate and granular materials from an end of a reciprocating conveyor floor and a cleanout cover system therefor.

Reciprocating floor conveyors associated with trucks, trailers and other facilities for loading and unloading particulate and granular materials comprise a plurality of laterally spaced, longitudinally elongated slat members arranged for longitudinal reciprocation on a selected pattern relative to each other, to move product supported thereon in a selected direction. In the present instance the invention relates to truck and trailer vehicles equipped with reciprocating floor beds, the vehicle being arranged for transporting large quantities of particulate materials such as hog fuel, sawdust, wood and bark shavings, wood chips, barkdust, sand, gravel, garbage and recycling materials, from a vehicle loading site to a remote unloading site at which the reciprocating floor is operated to discharge the selected material out of the back of the truck or trailer.

A cleanout cover apparatus for such vehicles has been provided heretofore and is shown in U.S. Pat. No. 6,033,179; issued 7 Mar., 2000 to Abbott. This reference provides the closest prior art relevant to the present invention.

In the patent, Abbott teaches a complex structure which provides a cover mounting reel assembly extending laterally across the entire front, closed end wall of the transport vehicle, the reel being disposed just above the front terminal end of the reciprocating floor floor structure of the vehicle. The reel assembly is installed within the confines created by a sloped front partition wall of the trailer structure which is provided to prevent loose material in the trailer from accumulating at the front-most end of the trailer at the front terminal end of the reciprocating floor structure.

Abbott teaches that the cleanout apparatus comprises a reel adapted for rotatable support on the trailer adjacent the bottom of the forward end wall thereof, behind the sloping front partition wall. A flexible cleanout cover is supported on the reel and is movable from a first retracted position in which it is coiled around the reel to a second, uncoiled extended position in which the cover extends through the rear door opening of the vehicle. Abbott teaches, importantly, that when the cleanout cover is in the first retracted position, it is disposed such that a portion thereof extends under the sloping front partition wall and over the reciprocating floor and under a portion of the particulate material adjacent the forward end wall of the trailer. Accordingly, the cleanout cover is moved from the first retracted position carried on the reel to the second, extended position in response to frictional engagement of the cover with the reciprocating floor as the floor is reciprocated to convey the particulate material rearwardly therealong and out through the rear door opening of the vehicle. The cleanout cover then is retracted from the second, extended position to the first retracted position carried on the reel in response to retracting rotation of the reel after the vehicle has been unloaded.

While the system of Abbott does provide a cleanout system that is adequate for the purpose, it involves an assembly that is complex and expensive, complicated to install, requiring installation either during original manufacture of the trailer and reciprocating floor apparatus, or otherwise extremely expensive retrofit installation requiring removal and replacement of the sloped front partition wall of the trailer. Further, the Abbott assembly is extremely susceptible to the effective sweeping of loose material on and beneath the cover into the space within the confines of the sloped wall during retraction of the cover onto the reel after the unloading operation. Additionally, the apparatus of Abbott requires a pair of laterally spaced tether cables or ropes secured at one end to the reel and at the opposite end to laterally spaced positions on a stiffener member that is secured to and extends the full width of the cover, whereby the tether cables or ropes are wound onto the reel together with the cover.

SUMMARY OF THE INVENTION

In its basic concept, the cleanout cover system of this invention includes a tension member-winding reel mounted adjacent the top edge of the front end wall centrally between the side walls of a vehicle having a reciprocating slat type conveyor floor bed. An elongated, windable tension member, preferably in the form of a narrow flexible strap member, is secured at its rear end intermediate the lateral ends of a reinforcing rib at the front end of the cover, and the forward end of the strap is connected to the winding reel for winding onto the reel in the winding direction of the cover. The drive mechanism for the reel is arranged to drive the reel in the cover winding direction and to provide substantially free rotation of the reel in the unwinding direction.

It is the principal objective of this invention to provide a simplified cleanout cover system that is specifically arranged for economical manufacture and greatly simplified installation in both new trailer constructions and in after market outfitting of trailers having reciprocating floor assemblies for the transport of particulate materials.

Another important objective of this invention is to provide a cleanout cover system for reciprocating floor type transport vehicles that is characterized by substantially entirely preventing passage of particulate material to the forwardmost portions of the container of the vehicle during transport, unloading and retraction of the cover after unloading operations.

Still another object of this invention is to provide a cleanout cover system in which a strap-winding reel assembly is configured in size to accommodate the winding and unwinding of an elongated, narrow strap having a width substantially less than the width of the cover member.

A further objective of this invention is to provide a cleanout cover system in which the cover is not subjected to winding onto and unwinding from a reel, thereby minimizing wrinkling, wear and other damage.

A still further objective of this invention is to provide a cleanout cover system of simplified and minimum size construction for enabling installation in a reciprocating floor type transport vehicle container with speed, facility and economy.

The foregoing and other objects and advantages of this invention will appear from the following detailed description, taken in connection with the accompanying drawings of a preferred embodiment.

BRIEF DESCRIPTION OF THE DRAWINGS

FIGS. 7a, 7b, 7c, and 7d are side elevations of the vehicle container and cleanout cover assembly in schematic form, the corresponding near side wall of the trailer being removed to disclose internal structural features, showing movement of the cover in sequential positions of movement of a load of particulate material in the unloading direction.

FIGS. 8a, 8b, 8c and 8d are side elevations of a vehicle container and a cleanout cover assembly in schematic form similar to FIGS. 7a–7d but showing a second embodiment of the cleanout cover assembly in which the cover member comprises a substantially rigid, generally upright movable bulkhead wall member, showing movement of the cover member in sequential positions of movement of a load of particulate material in the unloading direction.

FIGS. 9a, 9b, 9c and 9d are side elevations of a vehicle container and a cleanout cover assembly in schematic form similar to FIGS. 7a–d and FIGS. 8a–d but showing another embodiment of the cleanout cover assembly in which the front end of a flexible cover member is additionally supported by elongated track members mounted adjacent the top of the container for extension along the lateral sides thereof, for retention of the front end of the cover member in elevated condition above the underlying reciprocating floor and movement along the tracks throughout the length of the container, the views showing movement of the cover in sequential positions of movement of a load of material in the unloading direction.

DESCRIPTION OF THE PREFERRED EMBODIMENT

Figure 1:
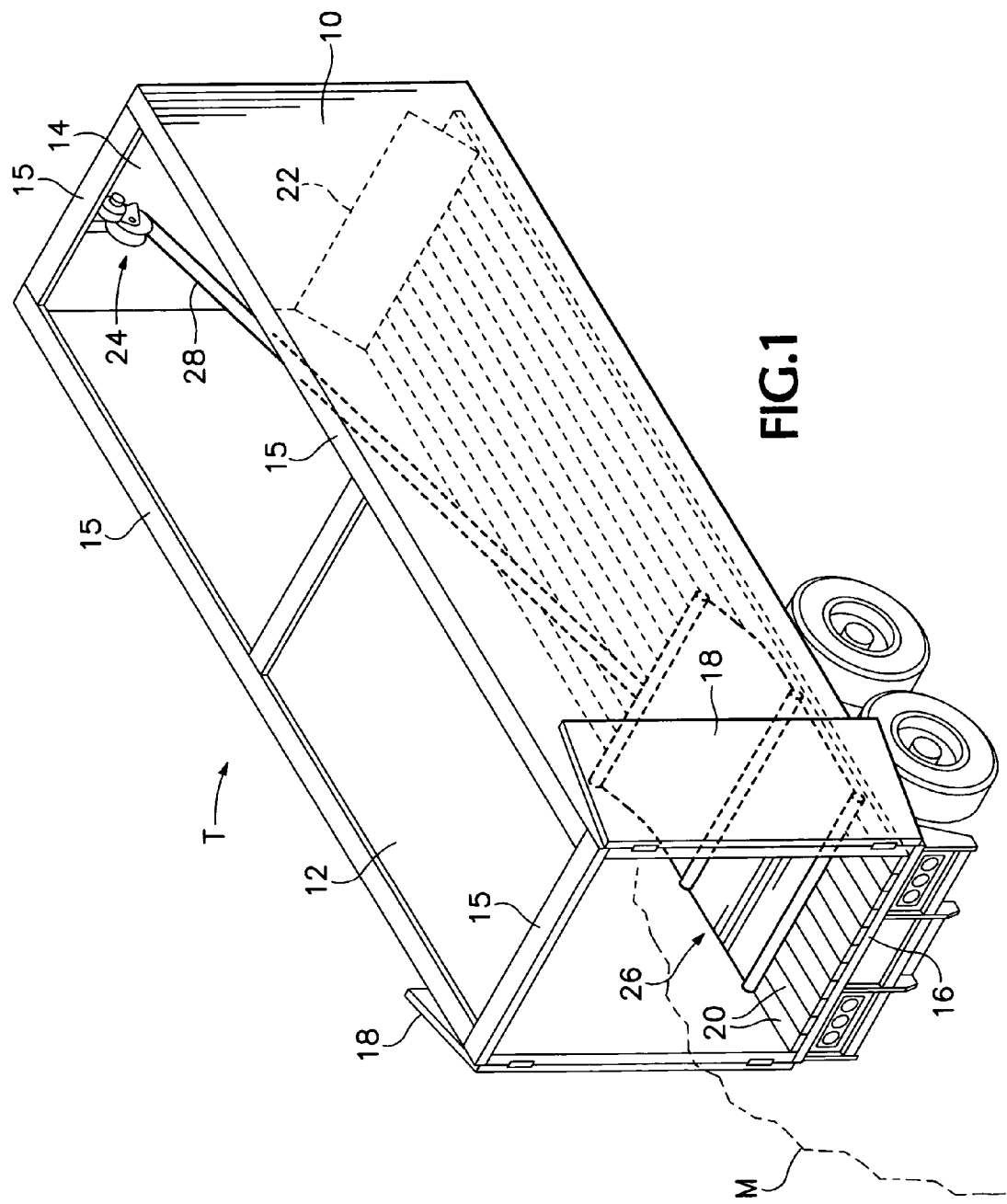
FIG. 1 is a top perspective view of a trailer container provided with a reciprocating floor and a cleanout cover system embodying the features of this invention, portions of the container walls being broken away to disclose details of construction.

Various preferred embodiments of the present invention are shown in the drawings associated with a large transport trailer container T having lateral side walls 10, 12; a closed front end wall 14; an open rear end 16 releasably closeable by rear end doors 18; and bottom supporting floor (not shown); together forming a hollow vehicle container having a powered, reciprocating floor bed apparatus 20 configured to support a load of particulate material for transport and, with the rear doors opened, operable to move the entire load of material rearwardly out of the open rear end of the container, in manner well known in the reciprocating floor transport trailer art. Typically, these types of trailer containers include a sloping front wall member 22 extending between the side walls 10, 12 and secured thereto and to the front wall 14 adjacent the floor 20, to prevent particulate material M from accumulating at the forwardmost end of the vehicle and undesirably falling to the area below the forward end of the reciprocating floor slats between the terminal ends of the slats and front wall of the container.

Figure 5:
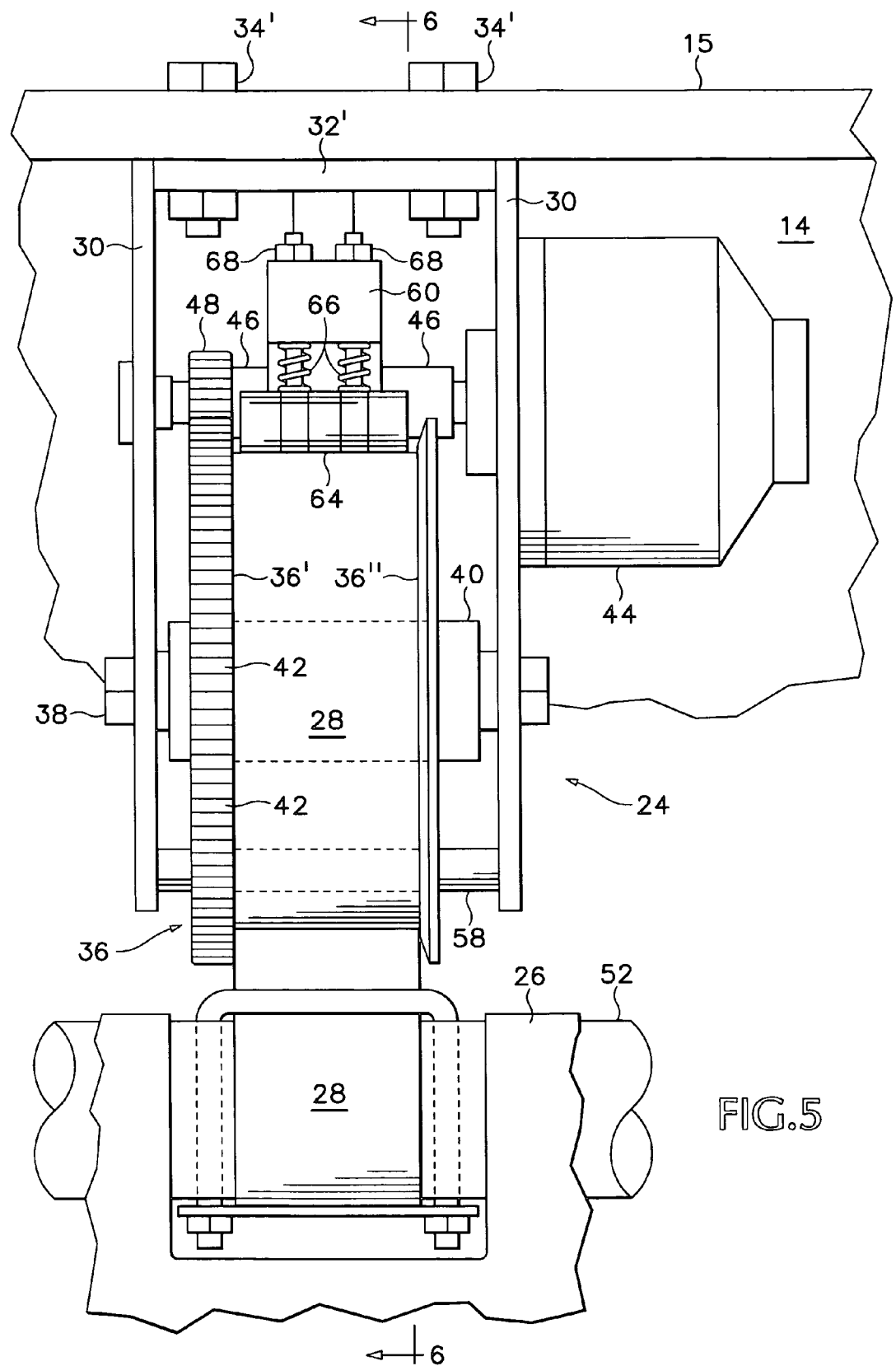
FIG. 5 is a fragmentary view in vertical elevation of the strap reel drive mounted on the top rail of the container adjacent the top end of the front end wall centrally between the side walls.
Figure 6:
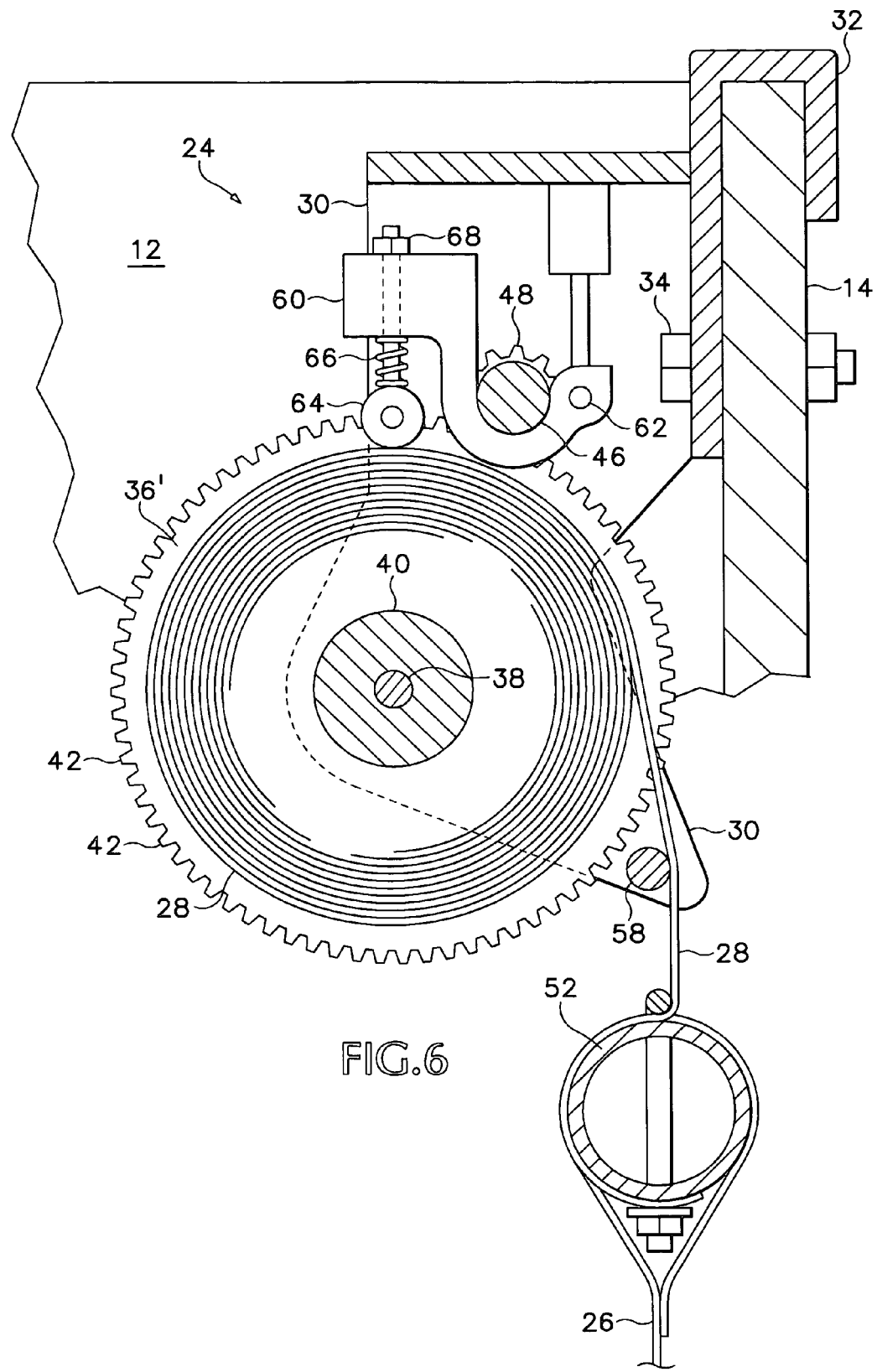
FIG. 6 is a fragmentary sectional view taken along the line 6—6 in FIG. 5 and also showing a modified mounting hanger bracket arrangement for mounting directly to the front end wall of containers not having top rail structures.

The cleanout cover system of this invention comprises only three basic components: A power driven tension member-supporting reel apparatus 24, a cover member 26 and an interconnecting, flexible, elongated tension member shown herein as strap member 28. Referring first to the power driven reel apparatus illustrated generally at 24, a preferred embodiment is illustrated in FIGS. 5 and 6 and schematically illustrated in the other figures. As illustrated, the reel assembly basically comprises a relatively small self-contained unit having a base framework 30 configured for mounting attachment to the central portion of the front wall 14 adjacent the top edge thereof, or to the center of a top rail structure 15 commonly provided in such vehicles, and positioned adjacent the top edge of the front wall and substantially centrally between the opposite side walls 10, 12 of the vehicle. In the embodiment illustrated in FIG. 6, the base framework 30 may include a projecting hanger bracket 32 configured to engage the top edge of the front wall 14 and to support the reel assembly 24 thereon, thereby permitting an installer to simply hang the unit in place on the top of the front wall 14 and then secure it in place to the wall as by means of mounting bolts 34 or other securing means suitable for securing the reel immovably in place for operation. As is seen in FIG. 5, the assembly may alternatively be arranged to be secured to the top rail structure 15 of a container having a top rail reinforcement structure, such as by a mounting bracket 32' secured to the top rail structure 15 as by bolts 34' or other desired securing means.

As shown, the base framework 30 is configured to mount a rotatable pickup reel 36 as by axle shaft 38, the pickup reel having a central spindle portion 40 spanning the opposite rims 36' 36" of the reel which is adapted to receive and contain an elongated tension member yet to be described. In the particular embodiment illustrated, one rim 36' of the pickup reel is provided as a sprocket member having a continuous array of gear teeth 42 formed about its outer peripheral edge. The framework 30 mounts a motor 44 having a rotating drive shaft 46 that mounts a toothed drive sprocket 48 configured for corresponding driving engagement with the gear teeth 42 of the pickup reel, whereby activation of the motor drive 44 rotates the pickup reel in a strap-winding direction.

Preferably the motor drive 44 is a pneumatic drive motor arranged to rotate the drive sprocket and associated pickup reel when the pneumatic motor is supplied with a source of pressurized air. The pneumatic motor is preferred because when pressurized air is not being supplied to the pneumatic drive, its drive shaft is permitted substantially free, unrestricted rotation, thereby allowing the pickup reel to rotate with substantially no resistance when the drive motor 44 is deactivated. Although a pneumatic motor is preferred and described herein, it is to be understood that electric, hydraulic and other forms of motors similarly provided for substantially free rotation when power is not being supplied may alternatively be used as well. This unpowered, free rotation aspect accomplishes an important purpose to be described later.

Figure 2:
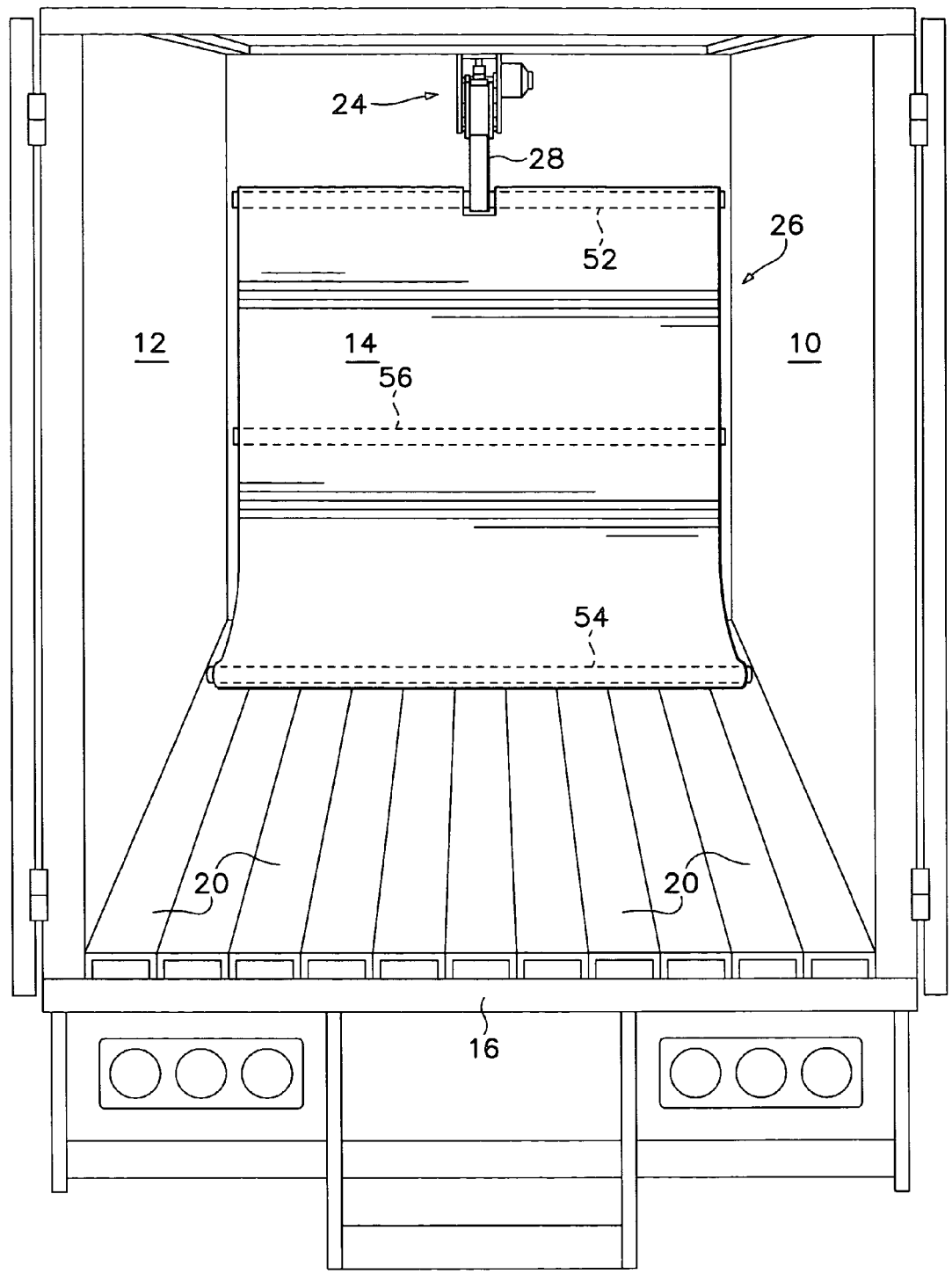
FIG. 2 is a vertical elevation viewing into the empty trailer container through its opened rear end and showing the cleanout cover in substantially retracted condition extending vertically downwardly from the reel drive along the front wall of the trailer and partially onto the reciprocating floor thereof preliminary to loading of the trailer with particulate material for transport.
Figure 3:
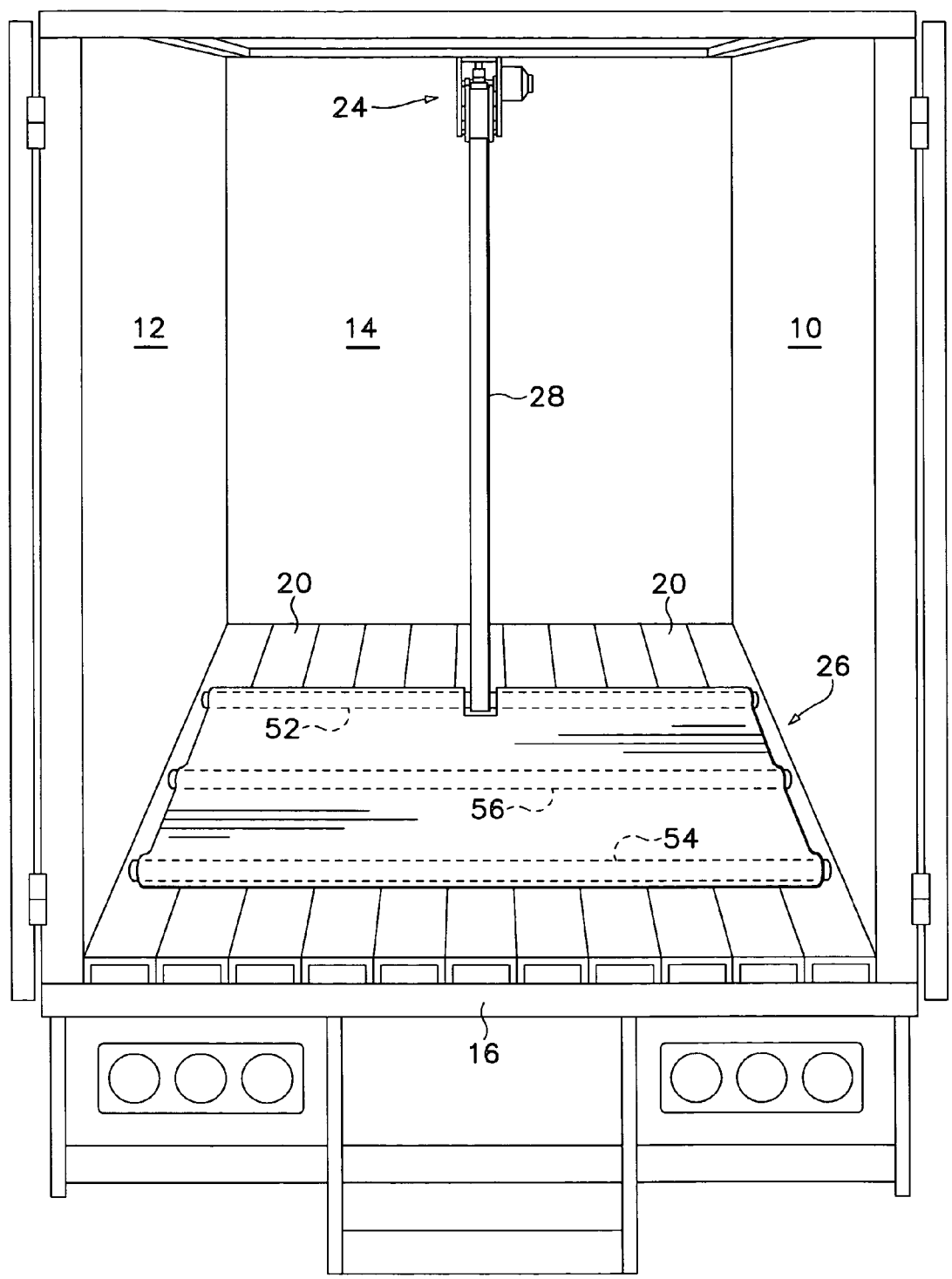
FIG. 3 is a vertical elevation similar to FIG. 2 but showing the cleanout cover in an intermediate position as it would be after operation of the reciprocating floor to partially empty a load of material (not shown) out of the rear end of the trailer container.

Another component of the system of this invention is a cover member illustrated generally at 26 and 70. As seen best in FIGS. 1, 2 and 7*a*, the cover member 26 illustrated herein provides a sheet 18 of flexible cover material having a width sufficient to span the entire width of the reciprocating floor bed of the vehicle container, between side walls 10 and 12. The cover member is configured with a length sufficient to extend from the elevated reel apparatus 24 mounted at the top of the front wall 14 of the vehicle, to a point overlying and covering a predetermined forward portion of the reciprocating floor bed, as best seen in FIGS. 2 and 7*a*. The cover sheet may be formed of any suitable, durable, flexible fabric material as may be desired for the purpose and materials being transported. Suitable fabric materials include vinyl, canvas, polyester and other synthetic fabric materials, and it has been found that a preferred cover material is 18 ounce vinyl coated polyester for its durability, weather resistance, lightweight and other qualities.

The cover member may also, if desired or needed for the particular purpose and material being handled, be provided in other forms as will be appreciated by those familiar with the art. For example, the cover member may alternatively comprise a mesh-type screen material as may be desired for the handling of larger, hard substances such as broken asphalt and concrete, etc. Also, the cover member may if desired or needed be formed of rubber or other desired materials which provide increased frictional interengagement between the load and the slats of a reciprocating floor for more positive unloading operation, as for example in the case of the load being in the form of bulk or palletized materials. Also, liquid resistant or impervious cover materials may be provided in the case of loads that are liquid-laden or somewhat fluid.

In an alternative form, the cover member may, as illustrated in the embodiment of FIGS. 8*a*–*d*, comprise a substantially rigid, upstanding generally "L"-shaped movable bulkhead wall member 70 configured generally with a vertically upstanding false front end wall 70' having a bottom, rearwardly projecting, rear end base portion 70" arranged for support on the reciprocating floor beneath a forward end portion of a load of material, substantially similarly to the flexible cover member 26 shown in FIGS. 7*a*–*d*. In this case, the upstanding movable bulkhead cover member 70 will, during unloading operation of the reciprocating floor of the container, move with the load M as will be described herein in connection with the operation of the flexible cover member of FIGS. 7*a*–*d*, and will be retracted by operation of the winch to wind the strap member 28 connected to the top end of the movable bulkhead member 70, as will become clear from the description of the flexible cover member, to follow later.

The flexible cover member illustrated herein is provided with laterally-extending reinforcing rib members 52, 54 secured to the front and rear ends, respectively, of the cover member to maintain the latter in proper, fully outstretched condition throughout operation of the system. These rib members may be formed of hollow PVC tubing which is preferred for its light weight and suitable rigidity when secured to the cover member. Of course, other rib materials and configurations may be provided, as desired or needed.

Figure 4:
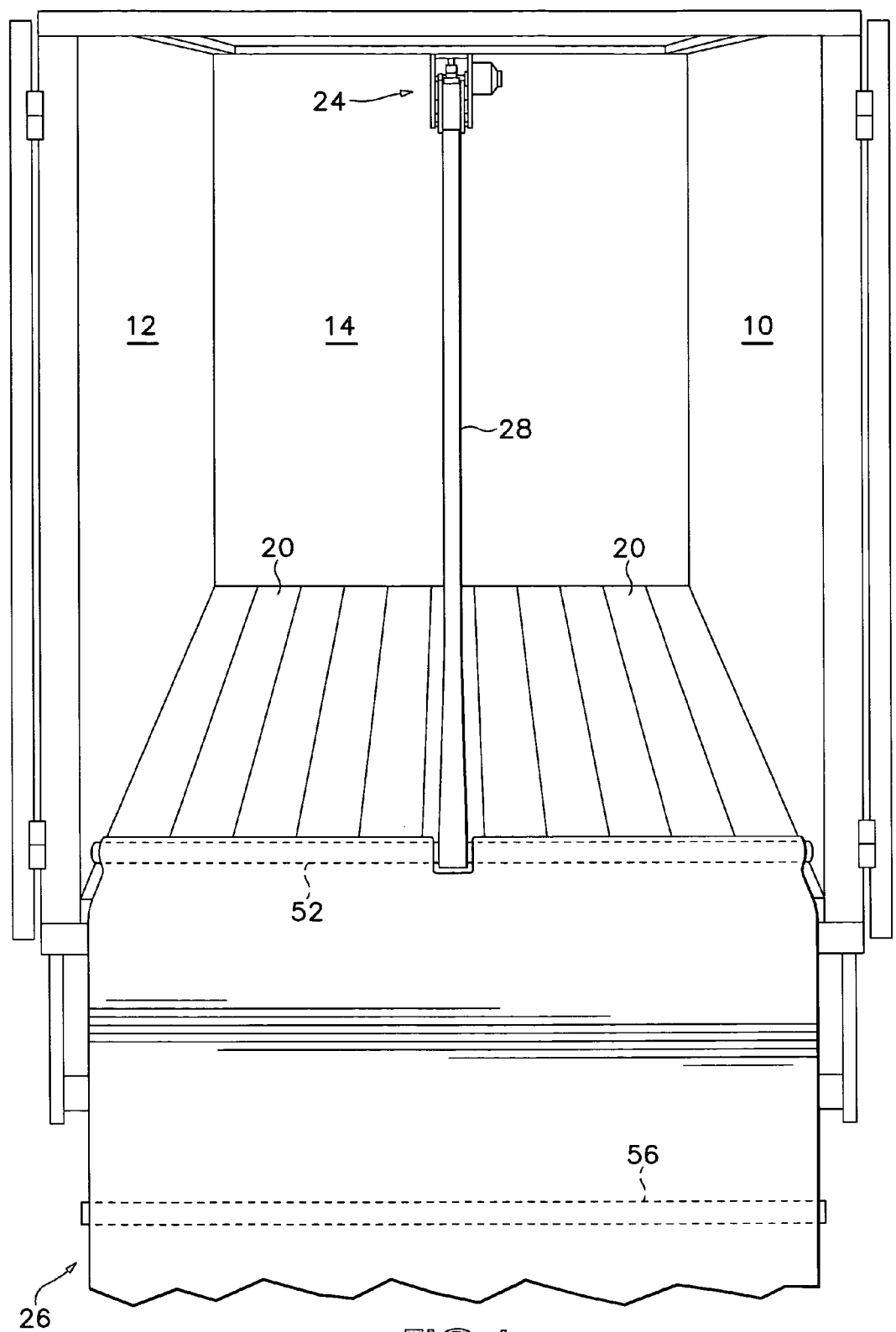
FIG. 4 is a vertical elevation similar to FIGS. 2 and 3 showing the cleanout cover in a substantially fully extended condition at and partially depending out of the open rear end of the trailer container after complete discharge of a load of material (not shown) from the trailer container.

As will be understood, the rib members, in addition to rigidifying the cover sheet across its width to keep the sheet in expanded condition, also provides the cover sheet with laterally extending, raised ledge-like abutment surfaces that serve to assure positive, captured contact of particulate material between the cover and the overlying load of particulate material supported thereon. This assures rearward movement of the cover member with the load of material during operation of the reciprocating floor to unload the container. Additional laterally extending, intermediate rib members 56 may be secured to the tarp in longitudinally spaced apart condition between the front and rear end ribs 52, 54 as shown, to enhance engagement between the cover and the particulate material load, primarily in the latter stages of the unloading operation where portions of the cover exit the rear end opening of the vehicle, as indicated in FIGS. 4 and 7*d*.

As best shown in FIGS. 2 and 6, the front rib member 52 is configured proximate its longitudinal mid point to anchor one end of a flexible, longitudinally elongated tension member, the opposite terminal end of which is secured to the spindle 40 of the reel 36. Although this elongated tension member may comprise members formed as a length of cable, rope or other typical winch line material, in its preferred form the elongated tension member comprises a thin, elongated strap member 28 of strong, durable, flexible strap material such as nylon webbing or other synthetic woven webbing material. A preferred strap member is approximately 2½ inches wide and formed of polyester webbing. Straps such as these are otherwise most widely recognized for their use in the provision of automobile seat belts and shoulder harnesses. This material is extremely strong and durable, nearly indestructible, and amply flexible while also being highly resistant to stretching along its length due to wear or aging. Also, this strap material, by virtue of its non-round configuration, does not roll and twist when wrapped onto and unwrapped from the pickup reel as is inherent in round, cord-like members, and therefore does not result over time in any kinking of the member or twisting effect on the cover member connected thereto. Preferably, as shown in FIG. 6, the framework 30 also mounts a tension member guide, strap guide 58 in the embodiment illustrated, arranged to ensure proper winding of the strap member 28 onto the reel. As will be apparent, the tension member guide will of course be arranged to accommodate the particular type of tension member being used, if other than the strap material shown herein.

As discussed previously, the pickup reel assembly is arranged for substantially unrestricted rotation when the pneumatic drive motor is not activated, and therefore friction brake means is preferably provided to prevent unwinding of the reel and falling of the cover member due to its own weight when the system is in the retracted, initial condition of FIGS. 2 and 7*a* wherein the cover is suspended from the reel assembly and depends downwardly therefrom adjacent the top edge of the front wall. In this regard, reference is again directed to FIG. 6 of the drawings wherein a preferred friction brake arrangement is shown as including a bracket arm member 60 mounted on the base frame 30 by pivot member 62 and configured to mount an axially movable friction foot member 64 arranged for tensioned engagement, as by tensioning spring 66, against the outermost wrap of the coil of strap material 28 contained on the pickup reel 36. The tension of the friction foot member 64 against the outermost wrapping of the strap coil may be varied as desired by the positioning of adjustment nut 68 on the threaded end of the shaft securing the friction foot member to the bracket arm member 60.

As will be apparent in viewing the assembly of FIG. 6, shown in condition with the strap member 28 fully wound on the pickup reel 36, the tension of the friction foot member 64 against the strap member 28 on the reel is set to prevent the rotation of the reel under the influence of the weight of the cover assembly suspended from it. The tension may be adjusted to accommodate the desired additional pull that is required to overcome the tension of the friction foot 64, as will be apparent. In this manner, the cover will remain suspended until the pull of the cover on the strap member overcomes the preset braking function when the cover member begins to move with the load of material during operation of the reciprocating floor, as shown clearly in the schematic illustrations of the operation of the system in FIGS. 7a–7d. Also, during loading of material into the container bed, this friction brake arrangement permits the cover to move and pull downwardly from the pickup reel apparatus as needed as material fills against the suspended cover without any significant strain being placed on the cover or the pickup reel apparatus, since the friction brake assembly is preferably set merely to overcome the suspended weight of the cover.

The operation of the system of this invention is readily apparent from viewing the operational procedure illustrated in FIGS. 7a–7d, wherein 7a shows the trailer container filled with a load of material M in condition for transport to an unloading site. FIG. 7b shows the initial stages of unloading, wherein the rear doors have been opened and the reciprocating floor has been activated to progressively move the load of material rearwardly. As will be apparent, the cover member is moved rearwardly along with the load of material as viewed in FIGS. 7b through FIG. 7d, by virtue of its underlying condition partially captured beneath the loaded material and its physical pressure contact with the reciprocating floor structure, by the weight of the overlying load.

When the load of material has been removed from the vehicle and the cover member 26 is approximately in the condition shown in FIG. 7d, the drive motor of the reel apparatus is activated to rewind the strap member 28 back onto the pickup reel. The tension of the friction brake against the coil of strap material increases as the diameter of the strap material on the reel increases, the tension reaching its preset maximum when the diameter of the coil of strap material on the reel is at its maximum and the front edge of the cover supported on the free end of the strap member by the reinforcing rib member 52 is disposed adjacent the reel assembly in suspended condition therefrom. The cover overlies substantially the entire front end portion of the trailer container. The operation of the embodiment of the system illustrated in FIGS. 8a–8d is substantially identical.

It is important to note, from the foregoing, that the spindle 40 of reel 36 is sized to receive and support the strap 28 which, as stated hereinbefore is preferably approximately 2½ inches wide. Additionally, the length of cover 26 is defined herein by the front and rear reinforcing rib members 52, 54 respectively. FIG. 7a shows the full length of the cover as hanging downwardly from the strap 28 adjacent the reel 24 to a position resting upon a portion of the reciprocating conveyor slats adjacent the sloping front wall 22. In this position the cover is engaged by a forward portion of the load of particulate material M the weight of which causes the cover to bear firmly against the conveyor slats. Accordingly, the weight of the particulate load presses the cover against the conveyor slats to effect movement of the cover rearwardly with the moving load. Thus, it is only the tension member, shown herein as strap 28, that is wound upon the reel 36, thereby minimizing the size and power requirements of the reel.

It is also to be noted, however, that the cover 26 in FIG. 7a extends the full width of the vehicle, defined by side walls 10 and 12, and substantially the full height of the container front end wall to substantially completely prevent particulate material M from entering the space behind it. This also effects a wiping or sweeping of the conveyor floor as the cover moves with the load during unloading. This ensures that when the load M is removed from the vehicle container, the conveyor is substantially free of the particulate material, thereby minimizing the clean-out time and effort. It will also be readily apparent from FIGS. 7a–7d that during both extension and retraction of movement of the cover 26, the elevated position of the reel assembly results in an angularly upward direction of pull on the strap and its connection to the front end 52 of the cover, thereby assuring against any material passing the front end of the cover either during loading, unloading and retraction of the cover after unloading of the container.

It will be apparent to those skilled in the art that various changes, other than those already described, can be made in the size, shape, type, number and arrangement of parts described herein. For example, it may be desired that the cover member, whether in the form of a substantially rigid movable bulkhead member or the flexible sheet type cover member form illustrated herein, be supported at its forward, upper end to maintain that end in secure, elevated, but longitudinally movable condition within the container.

In this regard, FIGS. 9a–d illustrate the front rib member 52 of cover member 26 may be arranged to mount roller members (not shown) or slide members (not shown) adjacent its opposite terminal ends for rolling or sliding interengagement with corresponding, longitudinally extending support track members 72 mounted adjacent the upper ends of the side walls along their length. In this manner, the forward end of the cover member 26 will be maintained in an elevated condition adjacent the top of the container and able to move therealong as needed as the load of material moves along the container during unloading operation as can be clearly understood from the operational views of FIGS. 9a–d.

When the winch is operated to wind the strap 28 connected to the rib member 52 at the front end of the cover member, the cover 26 is pulled along the elevated tracks 72 to the retracted condition of FIG. 9a adjacent the top end of the front end wall of the container. The operation of the embodiment of FIGS. 9a–d is substantially similar to that described in connection with FIGS. 7a–d, and clearly apparent in viewing the operational sequence of FIGS. 9a–9d.

Figure 10:
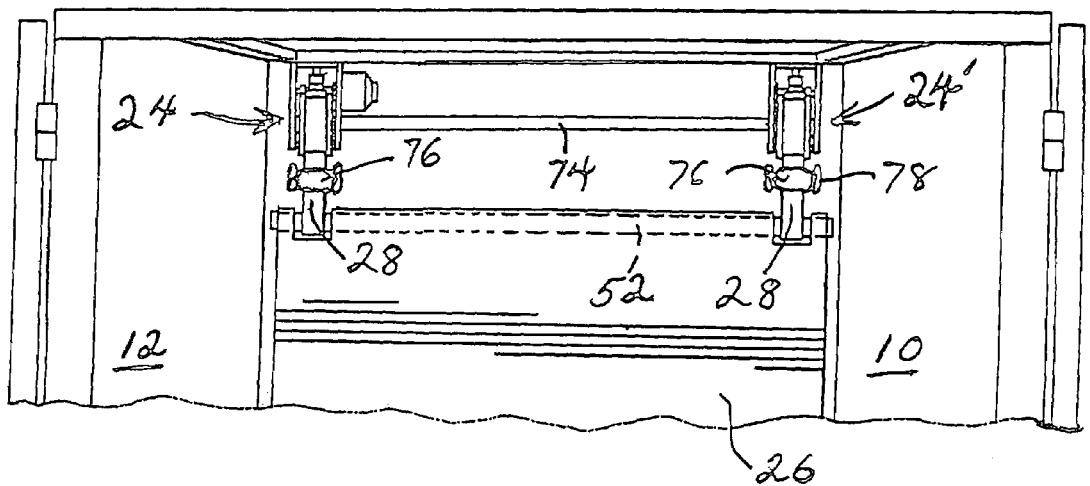
FIG. 10 is a fragmentary vertical elevation of the top front end portion of a container trailer as viewed from the rear and illustrating yet another embodiment of the cleanout cover system of this invention having a pair of laterally spaced apart winding reels mounted on the container engaging a pair of tension members connected to the cover member, a container-mounted guide associated with each tension member and corresponding reel.
Figure 11:
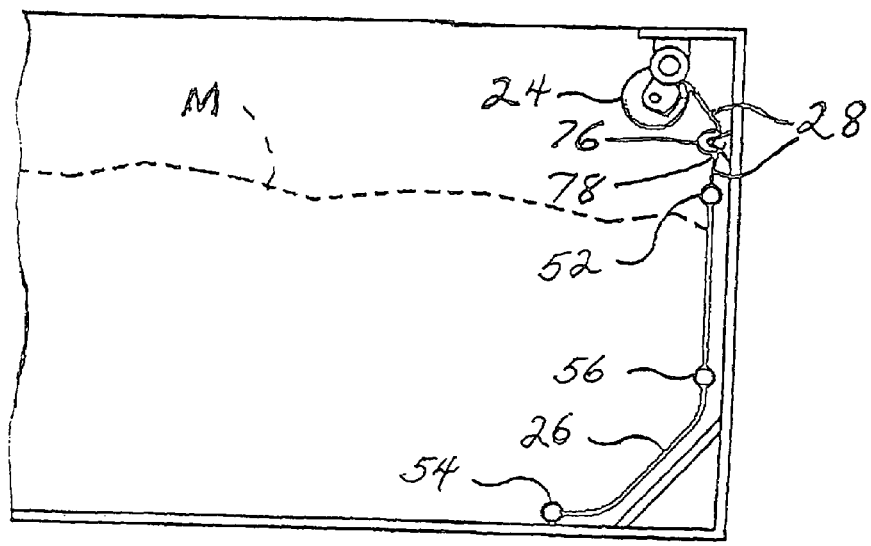
FIG. 11 is a fragmentary side elevation of the system of FIG. 10.

Also, as shown in yet another embodiment of the cleanout cover system of this invention as reflected in FIGS. 10 and 11 of the drawings, the system of this invention may if desired alternatively be arranged with more than one winding reel, such as the pair of reels 24, 24' mounted in an elevated position on the container, each reel arranged to engage a corresponding tension member 28 secured to the cover member 26. While each of the reels may be separate, independently powered units preferably controlled for operation in unison, they may as illustrated have a common drive motor, shown herein associated with winding reel 24, interconnected with other slave reels 24' by interconnecting drive shaft 74 or by other suitable drive linkage arrangement as will be readily apparent to those skilled in the art. As will also be readily evident, additional reels and corresponding tension members may be interposed intermediate the laterally spaced apart pair of reels and associated tension members illustrated if desired or needed for the purpose.

Also illustrated in FIGS. 10 and 11, tension member guide members may be provided in the form of one or more guides 76 mounted on the container in position closely adjacent the front end wall thereof as an alternative to, or in addition to the tension member guide 58 previously described in connection with the winding reel assembly 24 of FIGS. 5 and 6. In this regard, the tension member guide 76 is arranged for mount, such as by bracket mount 78, for support at a forward, elevated position on the container adjacent the front end wall, as seen best in FIG. 11.

This arrangement affords desired flexibility for the mounting of the reel or reels of the system in that it allows for the mounting of the reels on the container at a position spaced rearwardly of the front end wall, if needed, while still assuring that the associated tension member or members are guidingly retained at a fixed position closely adjacent the front end wall of the container for proper retracted positioning of the cover member closely adjacent the front end wall, as is apparent in FIG. 11. As will be clearly apparent to those skilled in the art, although individual tension member guides 76 are illustrated herein associated with each reel/tension member combination, the tension member guide may as well, if desired, be arranged in the form of a single, laterally-elongated unit arranged to guidingly engage multiple, laterally spaced apart reel and tension member assemblies as well.

Further changes other than those described may be made, as desired, without departing from the spirit of this invention and the scope of the appended claims.

I claim:

1. In combination with a container having side walls connected by a bottom and a front end wall and defining an open discharge rear end, and a reciprocating conveyor in the container having a plurality of elongated slats reciprocable to move particulate material in the container in the discharge direction, a conveyor cover system comprising:
   a) a cover member having a width to substantially span the distance between the side walls and having front and rear ends,
   b) an elongated tension member connected at one end to the front end of the cover member centrally of the ends thereof, and
   c) a tension member winding reel supported on the container adjacent the top end of the front end wall substantially centrally between the side walls of the container and connecting the end of the tension member opposite the end connected to the cover member.

2. The combination of claim 1 wherein the tension member winding reel has a width substantially the same as the tension member.

3. The combination of claim 2 wherein the tension member comprises an elongated strap member.

4. The combination of claim 1 including a drive motor connected to said reel for driving said reel and said cover member in the retracting direction toward the front wall of the container.

5. The combination of claim 4 including a brake operable to prevent unwinding of the tension member from the reel.

6. The combination of claim 1 wherein the drive motor is a pneumatic motor characterized by having unrestricted free rotation when pneumatic pressure is not applied, allowing unrestricted movement of the cover member.

7. The combination of claim 6 wherein the tension member winding reel includes a brake operable to prevent unwinding of the tension member when the pneumatic power motor is deactivated.

8. The combination of claim 1 wherein the cover member has a length sufficient to extend downwardly from its top front end adjacent the tension member winding reel to a rear end engaging and overlying the conveyor slats, whereby particulate material filled into the container covers the lower, rear end portion of the cover member and moves the cover member with the particulate material during unloading movement thereof.

9. The combination of claim 1 wherein the tension member comprises an elongated strap member.

10. In combination with a container having side walls connected by a bottom and a front end wall and defining an open discharge rear end, and a reciprocating conveyor in the container having a plurality of elongated slats reciprocable to move particulate material in the container in the discharging direction, a conveyor cover system comprising:
    a) a flexible cover member having a width to substantially span the distance between said side walls and having front and rear ends,
    b) an elongated tension member connected at one end to the front end of the cover member,
    c) a tension member winding reel supported on the container adjacent the top end of the front end wall substantially centrally between the side walls of the container and connecting the end of the tension member opposite the end connected to the cover member,
    d) the cover member having a length sufficient to hang downwardly from its front end adjacent the reel to a rear end engaging the conveyor slats, whereby particulate material filled into the container covers the lower, rear end portion of the cover member and moves the cover member with the particulate material during unloading movement thereof,
    e) a drive motor connected to said reel for driving said reel and said cover member in the retracting direction toward the front wall of the container, and
    f) a brake operable to prevent unwinding of the tension member from the reel when the pneumatic drive motor is deactivated.

11. The combination of claim 10 wherein the tension member comprises an elongated strap member.

12. In combination with a container having side walls connected by a front end wall and defining an open discharge rear end, and a reciprocating conveyor in the container having a plurality of elongated slats reciprocable to move particulate material in the container in the discharge direction, a conveyor cover system comprising:
    a) a flexible cover member having a width to substantially span the distance between said side walls and having front and rear ends,
    b) an elongated tension member connected at one end to the front end of the cover member centrally of the ends thereof,
    c) a tension member winding reel supported on the container adjacent the top end of the front end wall substantially centrally between the side walls of the container and connecting the end of the tension member opposite the end connected to the cover member, the reel having a width substantially the same as the tension member, d) a drive motor connected to said reel means for driving said reel and said cover member in the retracting direction toward the front wall of the container, the drive motor being a pneumatic motor characterized by having unrestricted free rotation when pneumatic pressure is not applied, allowing unrestricted movement of the cover member, and e) a brake on the reel operable to prevent unwinding of the tension member when the pneumatic drive motor is deactivated.

13. The combination of claim 12 wherein the tension member comprises an elongated strap member.

14. In combination with a container having side walls connected by a front end wall and defining an open discharge rear end wall, and a reciprocating conveyor in the container having a plurality of elongated slats reciprocable to move particulate material in the container in the discharge direction, a conveyor cover system comprising:

a) a flexible cover member having a width to substantially span the distance between said side walls and having front and rear ends, b) an elongated tension member connected at one end to the front end of the cover member centrally of the ends thereof, c) a tension member winding reel supported on the container adjacent the top end of the front end wall substantially centrally between the side walls of the container and connecting the end of the tension member opposite the end connected to the cover member, d) the cover member having a length sufficient to hang downwardly from its front end adjacent the reel to a rear end engaging the conveyor slats, whereby particulate material filled into the container covers the lower portion of the cover member and moves the cover member with the particulate material during unloading movement thereof, e) a drive motor connected to said reel for driving said reel and said cover member in the retracting direction toward the front wall of the container, the drive motor being a pneumatic motor characterized by having unrestricted free rotation when pneumatic pressure is not applied, allowing unrestricted movement of the cover member, and f) a brake on the reel operable to prevent unwinding of the tension member when the pneumatic drive motor is deactivated.

15. The combination of claim 13 wherein the tension member comprises an elongated strap member.

16. The combination of claim 15 wherein the reel has a width substantially the same as the strap member.

17. In combination with a container having sidewalls connected by a bottom and a front end wall and defining an open discharge rear end, and a reciprocating conveyor in the container having a plurality of elongated slats reciprocable to move particulate material in the container in the discharge direction, a conveyor cover system comprising:

a cover member having a width that substantially spans the distance between the sidewalls of the container and having front and rear ends;

at least one elongated tension member connected at one end to the front end of the cover member;

a winding reel supported at a forward elevated position on said container; and said elongated tension member extending forwardly and upwardly from the cover member and on to a connection with the reel, whereby rotating the reel in one direction will wrap the tension member onto the reel and pull the cover member forwardly in the container, and rotation of the reel in the opposite direction will allow the tension member to pay out from the reel, allowing the cover member to move rearwardly in the container.

18. The combination of claim 17 wherein the reel is mounted on the front end wall closely adjacent to the top of the container.

19. The combination of claim 17 wherein the reel is mounted on the top of the container, rearwardly of the front end wall, and a guide is provided on the container positioned adjacent the front end wall, and the tension member extends from the reel to the guide and from the guide downwardly and rearwardly to the cover member.

20. The combination of claim 17 comprising a pair of laterally spaced apart tension members and a pair of spaced apart reels, one for each of the tension members.

21. The combination of claim 20 wherein the reels are mounted on the front end wall of the container closely adjacent to the top of the container.

22. The combination of claim 20 wherein the reels are mounted on top of the container, rearwardly of the front end wall, and guides are provided on the container positioned adjacent the front end wall, and the tension members extend from the reels to the guides and from the guides downwardly and rearwardly to the cover member.

\* \* \* \* \*